United States Patent Office 3,020,288
Patented Feb. 6, 1962

3,020,288
HYPOTENSIVE COMPOUNDS
William Robert Wragg, Woodford Green, and Leslie Bretherick, Upminster, England, assignors to May & Baker Limited, Essex, England, a British company
No Drawing. Filed Mar. 19, 1959, Ser. No. 800,397
Claims priority, application Great Britain Mar. 24, 1958
1 Claim. (Cl. 260—313)

This invention is for improvements in or relating to compounds and compositions useful in the treatment of hypertension and to methods for the control of hypertension in patients suffering from elevated blood-pressure.

Because of the incapacitating nature of the condition, the fact that it lowers or stops the working capacity of a man or a woman, the problem of essential hypertension is an important economic, as well as a serious medical, one. Where surgical interference is not justified or is impracticable for any reason, recourse is had to the administration of drugs. Many types of drugs have heretofore been examined and, while there are available hypotensive drugs which make it possible for essential hypertensive sufferers to live reasonably comfortable and useful lives, there are still lacking hypotensive agents fulfilling all of the required criteria. Ideally, such a drug should effectively reduce the pressure, should not easily become tolerated and thus necessitate continually increasing doses, should not cause untoward side-effects (for example, constipation and dryness of the mouth), and preferably should be capable of oral administration in moderate doses in order to obviate continued subcutaneous injection.

Of the known hypotensive agents that have proved to be of sufficient value to warrant clinical use, a number are synthetic products. Among these hexamethonium salts and certain other quaternary salts of like chemical structure are particularly important; mode of action as well as effect, in terms of useful application, differs as between salts of different, though chemically closely related, cations. The search for new and improved synthetic hypotensive agents is greatly hampered by the fact that it is still not possible a priori to predict that a given substance of apparently close chemical relationship to a known hypotensive agent will have useful ganglion blocking activity.

It is an object of this invention to provide new hypotensive agents possessing a powerful ganglion blocking activity and ancillary properties which render them particularly useful in the treatment of hypertension. It is a further object of this invention to provide new hypotensive compositions which show advantage over prior known compositions. It is a still further object of this invention to provide an improved method for the control of hypertension.

According to the present invention these objects are accomplished by providing new pyrrolidines of the general formula:

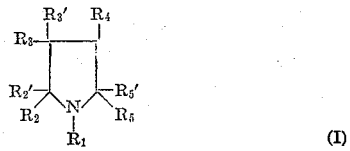

(I)

and their acid addition salts, where $R_1$ represents a hydrogen atom, or a lower alkyl or lower alkenyl group, $R_2$, $R_2'$, $R_5$ and $R_5'$ represent methyl or ethyl groups, and $R_3$, $R_3'$ and $R_4$ represent hydrogen atoms or lower alkyl groups, with the proviso that the total number of carbon atoms in the groups $R_1$, $R_2$, $R_2'$, $R_3$, $R_3'$, $R_4$, $R_5$ and $R_5'$ is at least five. The expressions "lower alkyl" and "lower alkenyl" are used in this specification and in the appended claims to denote groups containing 1 to 3 carbon atoms.

The preferred compounds of the invention are those pyrrolidines of Formula I in which $R_2$, $R_2'$, $R_5$ and $R_5'$ represent methyl groups and $R_3$, $R_3'$ and $R_4$ represent hydrogen atoms or methyl groups. Of particular importance are 1,2,2,5,5-pentamethylpyrrolidine, 1-ethyl-2,2,5,5-tetramethylpyrrolidine, 1 - propyl-2,2,5,5-tetramethylpyrrolidine, 2,2,3,3,5,5-hexamethylpyrrolidine, 2,2,3,4,5,5,-hexamethylpyrrolidine, 1,2,2,3,3,5,5 - heptamethylpyrrolidine, 1,2,2,3,4,5,5-heptamethylpyrrolidine and their acid addition salts.

According to features of the invention the aforesaid new pyrrolidines are prepared by the following methods:

(1) The pyrrolidines of Formula I where $R_4$ represents a hydrogen atom may be prepared by the reduction of a pyrrolidone of the formula:

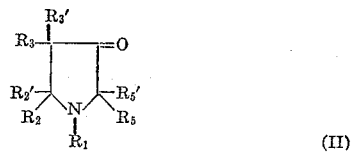

(II)

(wherein the various symbols are as hereinbefore defined) by known methods for the reduction of a 3- or 4-pyrrolidone carbonyl group to a methylene group which do not involve fission of the pyrrolidine ring. Preferably the reduction is carried out with hydrazine and an alkali metal hydroxide in a high boiling alcohol, such as diethylene glycol. An alternative method involves the conversion of the carbonyl group to a thioketal group and subsequent treatment of the thioketal with Raney nickel to generate the methylene group.

The starting materials of Formula II where one or both of $R_3$ and $R_3'$ represent lower alkyl groups can be prepared from the compounds of Formula II where one or both of $R_3$ and $R_3'$ represent hydrogen atoms by known methods for the alkylation of a methylene group activated by an adjacent carbonyl group.

(2) The pyrrolidines of Formula I where $R_4$ is a hydrogen atom may be prepared by the reduction of a 4-halogenopyrrolidine of the formula:

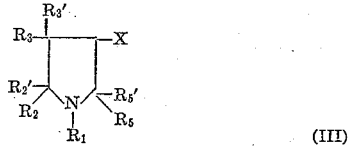

(III)

(wherein X represents a halogen atom and the other symbols are as hereinbefore defined) by known methods for the replacement of a halogen atom by a hydrogen atom. The reduction may be brought about with nascent hydrogen (produced for example by the reaction of aluminum amalgam with water, by the reaction of a metal such as zinc with an acid, such as hydrochloric or acetic acid, or by the reaction of a metal such as zinc or a zinc-copper couple with an alcohol), or with molecular hydrogen in the presence of a catalyst (such, for example, as palladium-charcoal in the presence of an acid-binding agent such as magnesium carbonate, palladium on calcium carbonate, or Raney nickel in the presence of an alkali metal hydroxide). Preferred methods of reduction are the reaction of zinc and acetic acid with a compound of Formula III, and the hydrogenation of such a compound in the presence of Raney nickel and potassium or sodium hydroxide. The starting materials of Formula III may be prepared from the corresponding 4-pyrrolidinols by known methods, and the 4-pyrrolidinols may themselves be prepared from the corresponding 4- pyrrolidones by known methods, for example by catalytic reduction.

(3) The pyrrolidines of Formula I where $R_1$ represents a hydrogen atom may be prepared by the reduction of a 1-hydroxy-pyrrolidine of the formula:

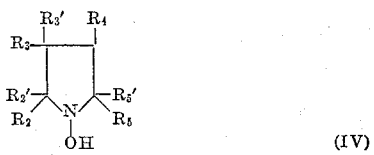

(IV)

(wherein the various symbols are as hereinbefore defined) by known methods for the reduction of an N,N-disubstituted hydroxylamine to a secondary amine. Preferably the reduction of the compound of Formula IV is carried out by reaction with zinc and hydrochloric acid, or by hydrogenation under mild conditions in a suitable solvent in the presence of Raney nickel.

(4) The pyrrolidines of Formula I where $R_3'$ and $R_4$ both represent hydrogen atoms may be prepared by the reduction of a $\Delta^{3,4}$-pyrroline of the formula:

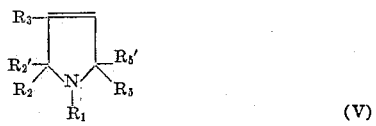

(V)

(wherein the various symbols are as hereinbefore defined) by known methods for effecting reduction of an ethylenic double bond, for example, with hydrogen in the presence of a metallic catalyst such as Raney nickel, or a noble metal. The $\Delta^{3,4}$-pyrrolines of Formula V may be prepared either from the corresponding 3-pyrrolidinols by dehydration using, for example, 50% sulphuric acid or from the corresponding 3-aminopyrrolidines by treatment of a solution thereof in excess mineral acid with a nitrite at a temperature below 20° C., followed by steam distillation of the reaction mixture.

(5) The pyrrolidines of Formula I where the groups $R_3'$ and $R_5'$ represent methyl groups may be prepared from a compound of formula:

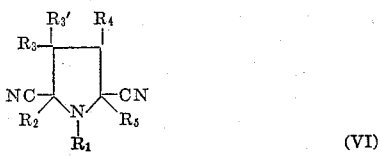

(VI)

(wherein the various symbols are as hereinbefore defined) by known methods for the replacement by a methyl group of a cyano group attached to a carbon atom adjacent to a nitrogen atom, for example by reaction with an organometallic compound containing a labile methyl group. Preferably a compound of Formula VI is treated with a methyl magnesium halide in an inert solvent such as an anhydrous ether. The starting materials of Formula VI may be prepared by reacting the cyanohydrin of a γ-diketone of formula

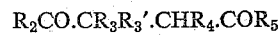

$$R_2CO.CR_3R_3'.CHR_4.COR_5$$

with a primary amine of formula $R_1NH_2$ preferably in an inert solvent and at below 50° C. The cyanohydrin may be produced by the action of anhydrous hydrogen cyanide on the diketone, preferably in the presence of a small amount of an alkali metal cyanide as catalyst.

(6) The pyrrolidines of Formula I where $R_1$ represents a lower alkyl or lower alkenyl group may be prepared from a compound of Formula I where $R_1$ represents a hydrogen atom and the number of carbon atoms in the groups $R_2$, $R_2'$, $R_3$, $R_3'$, $R_4$, $R_5$ and $R_5'$ is at least four by known methods for the alkylation (including alkenylation) of a secondary amine. Such methods include: (a) the employment of a reactive ester such as methyl iodide, methyl toluene-p-sulphonate, ethyl iodide, or allyl bromide, each in the presence of an acid binding agent; (b) (where $R_1$ is methyl) reaction with formic acid and formaldehyde; and (c) (where $R_1$ is methyl) hydrogenation in a suitable solvent, for example alcohol, containing dissolved formaldehyde in the presence of a hydrogenation catalyst, for example, palladium on charcoal or Raney nickel.

Where the product of this reaction is a 1-allyl-pyrrolidine, this may be reduced by known methods to a 1-n-propyl-pyrrolidine. Preferably this reduction is brought about with hydrogen in the presence of a catalyst such as Raney nickel.

The starting materials of Formula II where $R_3$ and $R_3'$ represent hydrogen atoms may be prepared by treating a 4-piperidone of the formula:

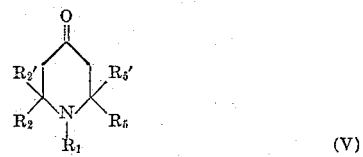

(V)

(wherein the various symbols are as hereinbefore defined) with bromine in the presence of hydrobromic acid to give the corresponding 3,5-dibromo-4-piperidone. The latter compound on treatment with ammonia in the presence of a strong base gives a compound of formula:

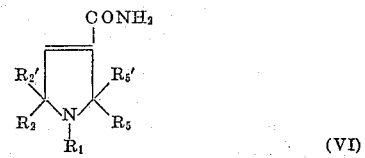

(VI)

(wherein the various symbols are as hereinbefore defined) which is converted into a compound of Formula II by treatment with a hypobromite in the presence of alkali. The compounds of Formula VI where $R_1$ represents a hydrogen atom may if desired by converted into a corresponding compound of Formula VI where $R_1$ represents a lower alkyl or alkenyl group by known methods before the conversion to a compound of Formula II is brought about.

The starting materials of Formula III may be prepared by the reaction of an organo-metallic derivative containing a labile $R_5'$ radical (such, for example, as a Grignard reagent of formula $R_5'MgX$) on a compound of the formula:

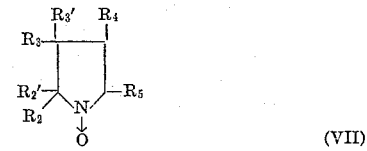

(VII)

(wherein the various symbols are as hereinbefore defined). The compounds of Formula VII may themselves be prepared by the reduction of a compound of the formula:

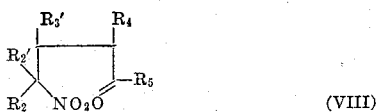

(VIII)

(wherein the various symbols are as hereinbefore defined) by known methods for the reduction of a nitro compound to a hydroxylamine derivative. The reduction may for example be carried out with zinc dust in the presence of an aqueous ammonium chloride solution. The compounds of Formula VIII may be prepared by the condensation of a nitro compound of formula:

(IX)

with an unsaturated ketone of formula:

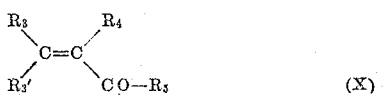

(wherein the various symbols are as hereinbefore defined), preferably in the presence of a basic catalyst and in an inert solvent.

The expression "known methods" as used in this specification and in the appended claims means methods heretofore used or described in the chemical literature. The term "halogen" is restricted in this specification and in the appended claims to chlorine, bromine and iodine.

When, as is preferred, the compounds of general Formula I are used for therapeutic purposes in the form of salts, it should be understood that only those such salts should in practice be employed as contain anions that are relatively innocuous to the animal organism when used in therapeutic doses so that the beneficial physiological properties inherent in the parent compound are not vitiated by side-effects ascribable to those anions; in other words, only non-toxic salts are contemplated. Suitable acid addition salts include hydrohalides (for example hydroclorides), phosphates, nitrates, sulphates, maleates, fumarates, citrates, tartrates, methane sulphonates and ethane disulphonates. These salts may be made from the bases of general Formula I by the methods heretofore used in the art for making acid addition salts. For example, the acid addition salts may be made by mixing the required base with an equivalent quantity of a non-toxic acid in a solvent and isolating the resultant salt by filtration after, if necessary, evaporation of part or all of the solvent. They may be purified by crystallisation or by any other method commonly used in the art.

The invention is illustrated by the following examples.

*Example I*

2,2,5,5-tetramethylpyrrolidine (6 g.) was added with stirring to ice-cooled formic acid (4.73 ml. of 90% w./v. solution), keeping the temperature below 8° C. The mixture was heated to 60° C., formaldehyde (4.73 ml. of 40% w./v. solution) was added and the mixture heated under reflux on a steam bath for 2 hours. Hydrochloric acid (33 ml. of 2 N solution) was added and the solution was evaporated to dryness. The residue was redissolved in water (10 ml.) and re-evaporated to dryness and desiccated to give crude 1,2,2,5,5-pentamethylpyrrolidine hydrochloride (8.1 g.). This was recrystallised from acetone to give the pure product (5.1 g.), M.P. 228–231° C., with previous shrinking and sublimation. The hydrogen tartrate may be prepared from this hydrochloride as follows. Crude 1,2,2,5,5-pentamethylpyrrolidine hydrochloride (162 g.) was dissolved in the minimum volume of water and treated at 0° C. with excess 50% sodium hydroxide and the liberated base extracted into ether. The ether extract was dried over anhydrous magnesium sulphate. The filtered ether solution was then added slowly to a solution of tartaric acid (127 g.) in hot ethanol (800 ml.). The precipitated salt was collected at 0° C. and crystallised from ethanol (2.2 l.) giving 1,2,2,5,5-pentamethylpyrrolidine hydrogen tartrate (193 g.), M.P. 169–170° C.

The 2,2,5,5-tetramethylpyrrolidine employed as starting material was prepared as follows. To 2,2,5,5-tetramethylpyrrolid-3-one hydrochloride (30 g.) dissolved in diethylene glycol (300 ml.) was added hydrazine hydrate (38 ml. of 60% w./v. solution) and potassium hydroxide (40 g.), and the mixture was boiled under reflux for 14 hours. The reaction mixture was distilled slowly until the internal temperature rose to 220° C., when steam distillation of the residue was begun. The combined distillates were collected in excess dilute hydrochloric acid. When the steam distillate was no longer basic, the acidic combined distillates were evaporated to dryness and desiccated to give a mixture (29 g.) containing the hydrochlorides of 2,2,5,5-tetramethylpyrrolidine and hydrazine.

The crude hydrochloride was mixed with diethylene glycol (29 ml.) and potassium hydroxide pellets (29 g.) and the crude base (containing hydrazine and water) was distilled out at an oil bath temperature of 150–160° C. The distillate was diluted with ether and Raney nickel (2 g.) was added to decompose the hydrazine present. When gas evolution had ceased, the nickel was removed by filtration. The filtrate was treated with excess ethereal hydrogen chloride, evaporated to dryness and desiccated to give 2,2,5,5-tetramethylpyrrolidine hydrochloride (7.7 g.). This was purified by recrystallisation from dry acetone to give a white microcrystalline powder, M.P. 309–312° C. (dec.).

The free base is isolated by distillation from a mixture of the hydrochloride, diethylene glycol and potassium hydroxide. It is a colourless liquid, B.P. 108–111° C. at atmospheric pressure.

*Example II*

Zinc dust (8.0 g.) was added in portions during 10 minutes to a stirred solution of 1-hydroxy-2,2,3,3,5,5-hexamethylpyrrolidine in concentrated hydrochloric acid (25 cc.) diluted with water (100 cc.), the internal temperature of the reaction mixture being maintained at 60° C. The mixture was stirred for a further hour at 60° to 70° C. and then cooled and filtered. The filtrate was basified at 0° C. with 50% sodium hydroxide and extracted with ether. The extract was dried over sodium sulphate and treated with a slight excess of ethereal hydrogen chloride. The residue after removal of the ether by distillation was twice dissolved in dry ethyl acetate and the solution evaporated to dryness. The dry residue could then be crystallised from ethyl acetate giving 2,2,3,3,5,5-hexamethylpyrrolidine hydrochloride, M.P. 254–256° C.

*Example III*

1-hydroxy-2,2,3,5,5-pentamethylpyrrolidine (18 g.) in methanol (274 cc.) was reduced with hydrogen in the presence of Raney nickel (1.8 g.) at 70 lbs. per square inch and 42° C. for 30 mins. when the theoretical uptake of hydrogen was observed. The solution was filtered and the base converted to the hydriodide salt which was recrystallised from isopropanol/ether to give 2,2,3,5,5-pentamethylpyrrolidine hydriodide (dec. above 275° C.).

*Example IV*

Proceeding as described in Example III, 1-hydroxy-2,2,5,5-tetraethylpyrrolidine was converted to 2,2,5,5-tetraethylpyrrolidine hydriodide, M.P. 220–222° C. (dec.).

*Example V*

Proceeding as described in Example III, 1-hydroxy-2-ethyl-2,5,5-trimethylpyrrolidine was converted to 2-ethyl-2,5,5-trimethylpyrrolidine hydriodide (dec. above 260° C.).

*Example VI*

Proceeding as described in Example III, 1-hydroxy-2,2,3,4,5,5-hexamethylpyrrolidine was converted to 2,2,3,4,5,5-hexamethylpyrrolidine hydriodide, M.P. 281–285° C. (dec.).

*Example VII*

2,2,5,5-tetramethylpyrrolidine (10 g.) was reacted with allyl bromide (4.75 g.) at 95° C. for 16 hours. The reaction mixture was diluted with ether and filtered. The filtrate was fractionated after removal of ether to give 1-allyl-2,2,5,5-tetramethylpyrrolidine, B.P. 61–63° C./15 mm. as a colourless liquid.

*Example VIII*

2,2,5,5-tetramethylpyrrolidine (5.1 g.) was reacted with ethyl toluene-p-sulphonate (4 g.) at 95° C. for 16 hours. The reaction mixture was diluted with ether and filtered. The filtrate was treated with hydriodic acid to give 1- ethyl-2,2,5,5-tetramethylpyrrolidine hydriodide, which after crystallisation from ethanol/ether melted at 292–293° C. (dec.).

Example IX 1-allyl-2,2,5,5-tetramethylpyrrolidine (2.1 g.) in methanol (50 cc.) was reduced with hydrogen in the presence of Raney nickel (0.21 g.) at 27° C. and 70 lbs. per sq. in. for 1 hour when a theoretical uptake of hydrogen was observed. The reaction mixture was filtered and treated with hydriodic acid to give 1-n-propyl-2,2,5,5-tetramethylpyrrolidine hydriodide which after crystallisation from isopropanol/ether melted at 247–249° C. (dec.).

Example X 1,2,2,5,5-pentamethylpyrrolid-3-one (7.25 g.) was added slowly with stirirng to a solution of 60% w./v. hydrazine hydrate (9.5 cc.) in diethylene glycol (76 cc.). Potassium hydroxide (7.7 g.) was added and the reaction mixture heated under reflux for 16 hours. The reflux condenser was then changed for distillation and the internal temperature slowly raised from 180° to 220° C. during 2 hours; removal of basic product from the reaction mixture was then completed by steam distillation. The total distilalte was collected in 2 N hydrochloric acid (50 cc.). This acid solution was evaporated to dryness in vacuo. The residue was treated with excess 50% sodium hydroxide and the base extracted into ether. The ether extract was dried and then treated with ethereal hydrogen chloride to give 1,2,2,5,5-pentamethylpyrrolidine hydrochloride, M.P. 228–231° C.

Example XI 1,2,2,5,5-pentamethyl-$\Delta^{3,4}$-pyrroline (0.8 g.) was hydrogenated in ethanol (30 cc.) at 152° C. and 400 lbs./sq. in. pressure in the presence of Raney nickel catalyst for 1.75 hours. The reduction product was filtered. The filtrate was just neutralised with ethereal hydrogen chloride and then evaporated to dryness in vacuo to give 1,2,2,5,5-pentamethylpyrrolidine hydrochloride, identical with the material obtained in Example I.

The starting material for this example was obtained as follows:

3-amino-1,2,2,5,5 - pentamethylpyrrolidine hydrochloride (17 g.) was dissolved in water and made strongly acid with concentrated hydrochloric acid. The solution was cooled to −10° C. when sodium nitrite (2 mols) was added. The solution was warmed to 20° C. and held at this temperature until no more nitrogen was evolved. The solution was rendered strongly alkaline and steam distilled into dilute hydrochloric acid. The steam distillate was evaporated to dryness and the crude hydrochloride was converted to the base, 1,2,2,5,5-pentamethyl-$\Delta^{3,4}$-pyrroline, B.P. 140–145° C., the hydriodide of which melted at 295–300° C. (dec.).

Example XII 2,5-dicyano-1,2,5-trimethylpyrrolidine (8.0 g.) dissolved in dry ether (250 ml.) was added with stirring to a cold solution of methyl magnesium iodide prepared from magnesium turnings (5.9 g.) and methyl iodide (31.35 g.) in dry ether (200 ml.).

After being refluxed for 2 hours, the resulting suspension was cooled and treated with water (25 ml.) and 50% aqueous sodium hydroxide (20 ml.). The ether layer was removed and the aqueous residue further extracted with ether (3 x 400 ml.). Addition of alcoholic hydriodic acid to the combined ether extracts gave a precipitate. This solid was collected, basified with 50% sodium hydroxide and the resulting mixture steam distilled. 1,2,2,5,5-pentamethylpyrrolidine was isolated from the steam volatile fraction as the hydrochloride (M.P. 231–2° C.).

The present invention includes within its scope pharmaceutical compositions which comprise one or more compounds of general Formula I or their acid addition salts as aforesaid together with a significant amount of a pharmaceutical carrier. The invention includes especially such compositions made up for oral or parenteral administration. In clinical practice the compounds of the present invention will normally be administered orally so that compositions suitable for oral administration are preferred.

Solid compositions for oral administration include compressed tablets, pills, dispersible powders, and granules. In such solid compositions one or more of the active compounds of general Formula I is or are admixed with at least one inert diluent such as calcium carbonate, potato starch, alginic acid, or lactose. The compositions may also comprise, as is normal practice, additional substances other than inert diluents, e.g. lubricating agents, such as magnesium stearate.

Liquid compositions for oral administration include pharmaceutically acceptable emulsions, solutions, suspensions, syrups and elixirs containing inert diluents commonly used in the art, such as water and liquid paraffin. Besides inert diluents such compositions may also comprise adjuvants, such as wetting and suspending agents, and sweetening flavoring agents.

The compositions according to the invention, for oral administration, also include capsules of absorbable material such as gelatin containing one or more of the active substances of general Formula I with or without the addition of diluents or excipients.

Preparations according to the invention for parenteral administration include sterile aqueous or non-aqueous solutions, suspensions, or emulsions. Examples of non-aqueous solvents or suspending media are propylene glycol, polyethylene glycol, vegetable oils such as olive oil, and injectable organic esters such as ethyl oleate. These compositions may also contain adjuvants such as wetting, emulsifying and dispersing agents. They may be sterilised by, for example, filtration through a bacteria-retaining filter, by incorporation in the compositions of sterilising agents, by irradiation, or by heating. They may also be manufactured in the form of sterile solid compositions, which can be dissolved in sterile water or some other sterile injectable medium immediately before use.

The percentage of active ingredient in the compositions of the invention may be varied, it being necessary that it should constitute a proportion such that a suitable dosage shall be obtained. Obviously several unit dosage forms may be administered at about the same time. In general, the preparations of the present invention should normally contain at least 0.025% by weight of active substance in the case of injectable solutions and at least 0.1% by weight of such substance in the case of oral preparations.

The following examples will serve to illustrate pharmaceutical compositions according to the invention.

Example XIII

Tablets of the formula:

| | Mg. |
|---|---|
| 1,2,2,5,5-pentamethylpyrrolidine hydrogen tartrate | 2.5 |
| Lactose | 87.3 |
| Maize starch | 5.0 |
| Sodium carboxymethyl cellulose | 0.2 |
| Stearic acid | 5.0 | are prepared by dissolving 1,2,2,5,5 - pentamethylpyrrolidine hydrogen tartrate in water and dispersing the sodium carboxymethyl cellulose in the solution. The solution so obtained is then mixed with an intimate mixture of the lactose and starch and the resulting mass passed through a 12-mesh sieve. The resulting granules are dried overnight at 70° C. and then passed through a 16-mesh sieve. The stearic acid is added at this stage as a lubricant. These granules are then compressed into tablets.

Example XIV

An injectable solution of the formula:

| | G. |
|---|---|
| 1,2,2,5,5-pentamethylpyrrolidine hydrochloride | 0.25 g. |
| Distilled water | Up to 100 ml. | is prepared by dissolving the 1,2,2,5,5-pentamethylpyrrolidine hydrochloride in the distilled water. The solution is filtered and filled into ampoules which are sterilised in an autoclave.

Example XV

An injectable solution of the formula:

| | G. |
|---|---|
| 1-ethyl-2,2,5,5-tetramethylpyrrolidine hydrochloride | 0.5 |
| Chlorocresol | 0.2 |
| Distilled water up to 100 ml. | | is prepared by dissolving the 1-ethyl-2,2,5,5-tetramethylpyrrolidine hydrochloride in the distilled water containing the chlorocresol and sterilising the solution by heating in an autoclave at a pressure of 10–15 lbs. per square inch during 30 minutes. There is thus obtained a sterile solution suitable for parenteral administration for therapeutic purposes.

When the 1-ethyl-2,2,5,5-tetramethylpyrrolidine hydrochloride used as starting material is replaced by 2,2,3,5,5-pentamethylpyrrolidine hydrochloride there is likewise obtained a sterile solution suitable for parenteral administration for therapeutic purposes.

Example XVI

A mixture of 2,2,3,3,5,5-hexamethylpyrrolidine hydrogen tartrate (10 g.) and calcium carbonate (70 g.) is granulated by admixture with a sufficient quantity of 10% aqueous maize starch paste. The granules are passed through an 8-mesh sieve and after drying at 50–55° C. they are then coated with a sufficient quantity of a solution of shellac (15 g.), castor oil (3 g.) and ethyl alcohol (800 g.). Magnesium stearate (3 g.) is then added to the granules after which the mixture is compressed to give tablets suitable for oral administration for therapeutic purposes.

Example XVII

Methyl p-hydroxybenzoate (1.5 g.) and propyl p-hydroxybenzoate (0.6 g.) are dissolved in propylene glycol (400 g.). Lemon oil (1.5 g.) is dissolved in the solution which is then added to a solution of 1-ethyl-2,2,5,5-tetramethylpyrrolidine hydrochloride (10 g.) in water (1.8 l.). A slurry of sodium carboxymethylcellulose (0.5 g.) in propylene glycol (200 g.) is added with stirring to the mixture. When the mixture is homogeneous, Syrup B.P. (600 g.) is added. There is thus obtained a formulation suitable for oral administration for therapeutic purposes.

We claim:

A member of the class consisting of 1-ethyl-2,2,5,5-tetramethylpyrrolidine and its acid pharmaceutically acceptable addition salts.

References Cited in the file of this patent

Chemical Abstracts 33, p. 5393$^{6-7}$, 1939.
Chemical Abstracts 47, pp. 562–563, 1953.
Chemical Abstracts 45, p. 592$^d$, 1951.
Chemical Abstracts 49, p. 290, 1955.
Allen et al.: Proc. of the Staff Meetings of the Mayo Clinic, 29: 17, pp. 459–478, Aug. 25, 1954.